(12) United States Patent
Ausserlechner

(10) Patent No.: US 9,435,662 B2
(45) Date of Patent: Sep. 6, 2016

(54) MAGNETO-RESISTIVE ANGLE SENSOR AND SENSOR SYSTEM USING THE SAME

(71) Applicant: Infineon Technologies AG, Neubiberg (DE)

(72) Inventor: Udo Ausserlechner, Villach (AT)

(73) Assignee: Infineon Technologies AG, Neubiberg (DE)

(*) Notice: Subject to any disclaimer, the term of this patent is extended or adjusted under 35 U.S.C. 154(b) by 170 days.

(21) Appl. No.: 14/247,361

(22) Filed: Apr. 8, 2014

(65) Prior Publication Data

US 2015/0285661 A1    Oct. 8, 2015

(51) Int. Cl.
| | | |
|---|---|---|
| G01R 33/09 | (2006.01) | |
| G01D 5/16 | (2006.01) | |
| G01D 5/14 | (2006.01) | |
| G01D 5/244 | (2006.01) | |

(52) U.S. Cl.
CPC .............. *G01D 5/16* (2013.01); *G01D 5/145* (2013.01); *G01D 5/24485* (2013.01)

(58) Field of Classification Search
CPC .......... G01D 5/12; G01D 5/16; G01D 5/145; G01B 7/30; G01R 33/02; G01R 33/09
See application file for complete search history.

(56) References Cited

U.S. PATENT DOCUMENTS 4,053,829 A * 10/1977 Maruo ................ G01R 33/09
                                                          324/247
7,265,540 B2    9/2007 Sudo et al.

(Continued)

OTHER PUBLICATIONS

Ausserlechner, U.: "Inaccuracies of anisotropic magneto-resistance angle sensors due to assembly tolerances", Progress in Electromagnetics Research B, vol. 40, pp. 79-99, 2012.

(Continued)

*Primary Examiner* — Son Le
(74) *Attorney, Agent, or Firm* — Eschweiler & Associates, LLC

(57) ABSTRACT

A magneto-resistive angle sensor includes a first half bridge circuit including a first magneto-resistive element and a second magneto-resistive element, and a second half bridge circuit having a third magneto-resistive element and a fourth magneto-resistive element, wherein the first, second, third, and fourth magneto-resistive element are arranged parallel to a x'/y'-plane of a Cartesian reference system with an x'-axis and y'-axis, both orthogonal to each other. The geometrical gravity centers of the first and the second magneto-resistive elements of the first half bridge circuit and the geometrical gravity centers of the third and the fourth magneto-resistive elements of the second half bridge circuit have an identical x'-coordinate, wherein the sum of the value of the geometrical inertia moment of the first magneto-resistive element around the y'-axis, the negative value of the geometrical inertia moment of the second magneto-resistive element around the y'-axis, the value of the geometrical deviation moment of the third magneto-resistive element in the x'/y'-plane and the negative value of the geometrical deviation moment of the fourth magneto-resistive element in the x'/y'-plane vanishes within a tolerance range. Further, the sum of the value of the geometrical inertia moment of the third magneto-resistive element around the y'-axis, the negative value of the geometrical inertia moment of the fourth magneto-resistive element around the y'-axis, the negative value of the geometrical deviation moment of the first magneto-resistive element in the x'/y'-plane and the value of the geometrical deviation moment of the second magneto-resistive element in the x'/y' vanishes within a tolerance range.

21 Claims, 5 Drawing Sheets

(56) References Cited

U.S. PATENT DOCUMENTS

| | | | |
|---|---|---|---|
| 2006/0103381 A1* | 5/2006 | Schmollngruber | B82Y 25/00 324/252 |
| 2009/0206827 A1* | 8/2009 | Aimuta | G01D 5/2451 324/207.25 |
| 2011/0068780 A1* | 3/2011 | Sakai | G01D 5/145 324/207.25 |

OTHER PUBLICATIONS

Ausserlechner, U.: "Inaccuracies of giant magneto-resistive angle sensors die to assembly tolerances", IEEE Trans. Magn., vol. 45, No. 5, pp. 2165-2174, May 2009.

Ausserlechner, U.: "The optimum layout for giant magneto-resistive angle sensors", IEEE Sens. J., vol. 10, No. 10, pp. 1571-1582, 2010.

* cited by examiner

R1=R1a+R1b
R2=R2a+R2b
R3=R3a+R3b
R4=R4a+R4b

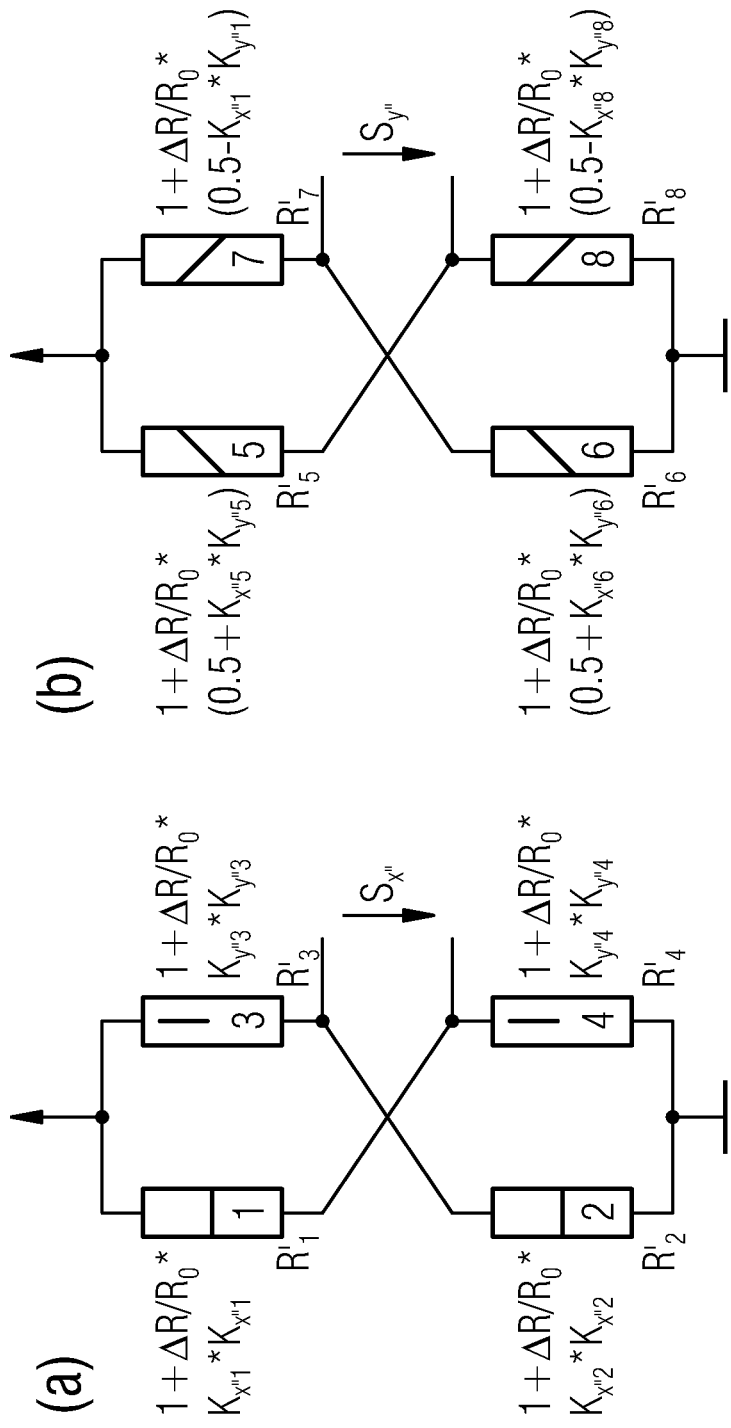

MAGNETO-RESISTIVE ANGLE SENSOR AND SENSOR SYSTEM USING THE SAME

FIELD

The disclosure relates to a magneto-resistive angle sensor and a sensor system using the same. In particular, the present disclosure relates to an optimized or optimum layout of sensor elements for an off-axis XMR angle sensor.

BACKGROUND

In general, a magnetic angle sensor arrangement consists of a small permanent magnet on a rotating shaft, e.g. attached to a stator system. Magnetic field sensors detect the field of the rotating magnet and conclude back on the rotational position of the shaft. Angle errors are partly caused by the sensor elements, partly by the electronic processing and partly by the assembly tolerances of the angle sensor system. As sensor technology, electronic circuits and automated calibration in the end-of-line tests of the semiconductor manufacturers are continuously improving, the accuracy of the angle sensor arrangements will be dominated by the assembly tolerances.

SUMMARY

A magneto-resistive angle sensor comprises a first half bridge circuit comprising a first magneto-resistive element and a second magneto-resistive element, and a second half bridge circuit having a third magneto-resistive element and a fourth magneto-resistive element, wherein the first, second, third, and fourth magneto-resistive element are arranged parallel to a x'/y'-plane of a Cartesian reference system with an x'-axis and y'-axis, both orthogonal to each other. The geometrical gravity centers of the first and the second magneto-resistive elements of the first half bridge circuit have within a tolerance range an identical x'-coordinate. The geometrical gravity centers of the third and the fourth magneto-resistive elements of the second half bridge circuit have within a tolerance range an identical x'-coordinate. The sum of the value of the geometrical inertia moment of the first magneto-resistive element around the y'-axis, the negative value of the geometrical inertia moment of the second magneto-resistive element around the y'-axis, the value of the geometrical deviation moment of the third magneto-resistive element in the x'/y'-plane and the negative value of the geometrical deviation moment of the fourth magneto-resistive element in the x'/y'-plane vanishes within a tolerance range. Moreover, the sum of the value of the geometrical inertia moment of the third magneto-resistive element around the y'-axis, the negative value of the geometrical inertia moment of the fourth magneto-resistive element around the y'-axis, the negative value of the geometrical deviation moment of the first magneto-resistive element in the x'/y'-plane and the value of the geometrical deviation moment of the second magneto-resistive element in the x'/y' vanishes within a tolerance range.

The magneto-resistive sensor elements may comprise GMR elements, TMR elements and/or AMR elements, wherein the first magneto-resistive element has a first reference direction and the second magneto-resistive element has a second reference direction different to the first reference direction, and wherein the third magneto-resistive element has a third reference direction and the fourth magneto-resistive element has a fourth reference direction different to the third reference direction; and wherein the first, second, third, and fourth reference directions are parallel to the x'/y'-plane.

In case, the magneto-resistive sensor elements comprise GMR elements or TMR elements, the second reference direction is anti-parallel to the first reference direction, and wherein the fourth reference direction is anti-parallel to the third reference direction. In case, the magneto-resistive sensor elements comprise AMR elements, the second reference direction is orthogonal to the first reference direction, and wherein the fourth reference direction is orthogonal to the third reference direction.

A magneto-resistive angle sensor comprises a first full bridge circuit having a first and fourth magneto-resistive element and a second and third magneto-resistive element, and a second full bridge circuit comprising a fifth and eighth magneto-resistive element, and a sixth and seventh magneto-resistive element, wherein the first to eighth magneto-resistive elements are arranged parallel to a x'/y'-plane of a Cartesian reference system with an x'-axis and y'-axis, both orthogonal to each other;

The geometrical gravity centers of the first to eighth magneto-resistive elements of the first and second full bridge circuits have a within a tolerance range vanishing y'-coordinate. The values of the geometrical deviation moments of the first to eighth magneto-resistive elements in the x'/y'-plane within a tolerance range vanish. The geometrical gravity centers of the first and second magneto-resistive elements of the first full bridge have within a tolerance range an identical first x'-coordinate, and the geometrical gravity centers of the third and fourth magneto-resistive elements of the first full bridge have within a tolerance range an identical second x'-coordinate, wherein the first and second x'-coordinates have within a tolerance range an equal magnitude and an opposite sign. The geometrical gravity centers of the fifth and sixth magneto-resistive elements of the second full bridge circuit have within a tolerance range an identical third x'-coordinate, and the geometrical gravity centers of the seventh and eighth magneto-resistive elements of the second half bridge circuit have within a tolerance range an identical fourth x'-coordinate, wherein the third and fourth x'-coordinates have within a tolerance range an equal magnitude and an opposite sign.

The first and second magneto-resistive elements have within a tolerance range the same geometrical inertia moment around the y'-axis, the third and fourth magneto-resistive elements have within a tolerance range the same geometrical inertia moment around the y'-axis, the fifth and sixth magneto-resistive elements have within a tolerance range the same geometrical inertia moment around the y'-axis, and the seventh and eighth magneto-resistive elements have within a tolerance range the same geometrical inertia moment around the y'-axis.

The magneto-resistive sensor elements may comprise GMR elements, TMR elements and/or AMR elements, wherein the first and fourth magneto-resistive element have a first reference direction, and the second and third magneto-resistive element have a second reference direction different to the first direction, and wherein the fifth and eighth magneto-resistive element have a third reference direction, and the sixth and seventh magneto-resistive element have a fourth reference direction different to the third reference direction, and wherein the first, second, third, and fourth reference directions are parallel to the x'/y'-plane.

In case, the magneto-resistive sensor elements comprise GMR elements or TMR elements, the second reference direction is anti-parallel to the first reference direction, and wherein the fourth reference direction is anti-parallel to the second reference direction. In case, the magneto-resistive sensor elements comprise AMR elements, the second reference direction is orthogonal to the first reference direction, and wherein the fourth reference direction is orthogonal to the second reference direction.

A sensor system comprises at least three sub-units, each sub-unit comprises a magneto-resistive angle sensor, wherein the sub-units are arranged symmetrically on different positions corresponding to a geometric circle, the geometric circle comprising the rotation axis of the sensor system as center point.

The present disclosure is based on the finding that a minimization of angle errors in the output signal of an angle sensor can be achieved by optimizing the layout of the sensor elements especially in consideration of the finite dimensions (size and shape) of the respective sensor elements forming the magnetic angle sensor arrangement.

Assuming that the possible layout of magneto-resistive sensor elements with pinned magnetization (e.g. GMR or TMR elements) is composed of two orthogonal meanders, wherein the meanders cover a rectangular area. Moreover, a possible layout of magneto-resistive sensor elements without pinned magnetization (e.g. AMR elements) comprises an AMR resistor stripe (e.g. with a so-called barber pole configuration).

A generalization of the geometry of a magneto-resistive sensor element can be assumed, wherein the geometrical layout of the magneto-resistive sensor element with or without pinned magnetization has an elongated shape which is folded such as to essentially fill up a two-dimensional shape on the major surface of a substrate such as a rectangular area, a square area, a circular area, an oval area, a half-moon shape, a triangular area, a pentagonal area, a hexagonal area, a regular or irregular polygonal area. This geometrical layout can be achieved via meanders, spirals and/or less symmetric shapes of the elongated laminate structure of the magneto-resistive elements filling up the two-dimensional shape.

A point is that a magneto-resistive sensor element subtends or covers a two-dimensional area in an essentially homogeneous way, meaning that (i) the contributions of a local part of the element to the total signal does not significantly depend on the exact location within the two-dimensional area, provided that the magnetic field is homogeneous throughout this two-dimensional area, and (ii) the element is distributed evenly throughout the two-dimensional area such that no major part of the area is empty from parts of the element and the density of parts of element per parts of area is constant. Rectangular areas are often preferred as two-dimensional shapes, because they can be packed without wasting interstitial space. If the magneto-resistive sensor elements comprise pinned magnetization and if this is magnetized with the aid of laser heating it is also preferable if the areas have simple enough boundaries such that they can be heated up homogeneously with a single laser spot.

The following example embodiments are shown in the figures having rectangular areas, but it is pointed out that instead of these shapes all of the above mentioned shapes and further shapes are also possible as long as they comply to these rules. That is why the rules use abstract entities like the geometric moment of inertia or geometric deviation moment which apply to all two-dimensional shapes regardless of the exact geometry.

Based on an analytical calculation of the effect of finite size and shape of magneto-resistive sensor elements on the resulting angle error of off-axis angle sensors, a number of constraints and requirements, respectively, can be achieved for an optimized geometrical layout of a magneto-resistive angle sensor, which further depends on the implementation of the realization of the magneto-resistive angle sensor based on a half-bridge or full-bridge circuit design.

BRIEF DESCRIPTION OF THE DRAWINGS

Embodiments of the present disclosure are described herein making reference to the appended drawings.

FIG. 8 shows a schematic view of two full-bridge circuits with the eight AMR sensor elements for the magneto-resistive angle sensor of FIG. 6.

Figure 1A:
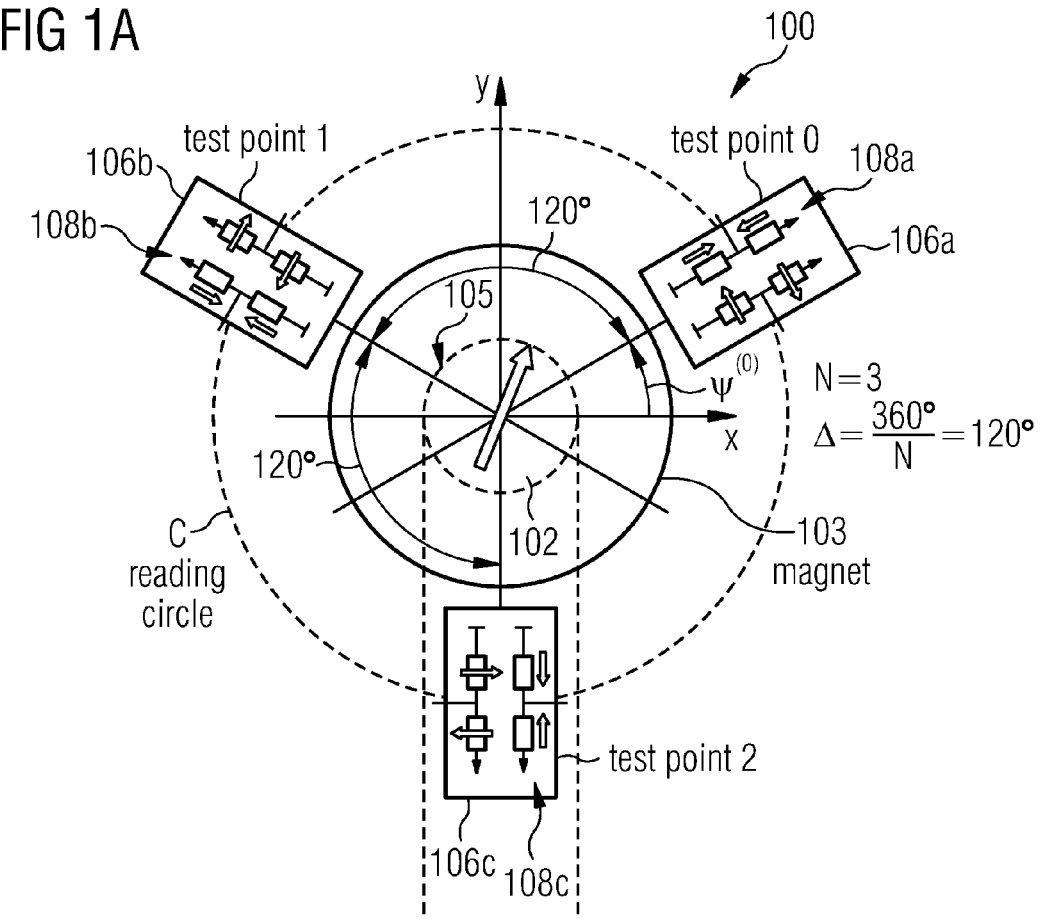
FIG. 1a shows a schematic plan view of an off-axis angle sensor with three subunits (satellites) according to an embodiment.

Equal or equivalent elements or elements with equal or equivalent functionality are denoted in the following description by equal or equivalent reference numerals.

DETAILED DESCRIPTION

In the following, a plurality of details are set forth to provide a more thorough explanation of the embodiments of the present disclosure. However, it will be apparent to those skilled in the art that embodiment of the present disclosure may be practiced without these specific details. In other instances, well-known structures and devices are shown in block diagram form or in a schematic view rather than in detail in order to avoid obscuring embodiments of the present disclosure. In addition, features of the different embodiments described hereinafter may be combined with each other, unless specifically noted otherwise.

Figure 1B:
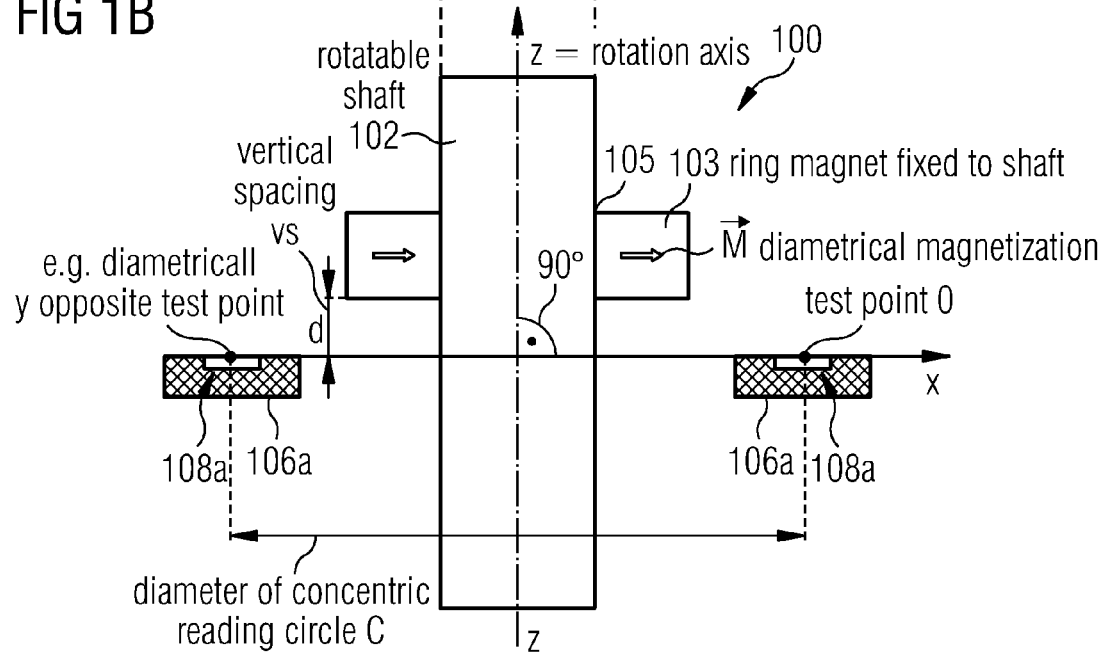
FIG. 1b shows a schematic elevation view of the off-axis angle sensor with an even number of subunits (magneto-resistive angle sensors) according to a further embodiment.

Based on the configuration of an off-axis angle sensor system with (at least) three subunits (in form of at least three magneto-resistive angle sensors) as shown in FIGS. 1a-b, the assessment and determination of the layout requirements #1 to #4 and of optional layout requirements #5 and #6 for the first, second, third and fourth magneto-resistive elements R1, R2, R3, R4 (of the magneto-resistive angle sensors) will be described in detail.

According to embodiments of the present disclosure, a magneto-resistive angle sensor for detecting a magnetic field comprises magneto-resistive sensor elements or structures, which are in the following generally referred to as magneto-resistive (MR) sensor elements. In the following description, the term "magneto-resistive sensor element" is to include all known magnetoresistive structures such as AMR (anisotropic magneto resistance) structures, GMR (giant magneto resistance) structures, CMR (colossal magneto resistance) structures, TMR (tunnel magneto resistance) structures or EMR (extraordinary magneto resistance) structures. In technical applications of GMR and TMR sensor assemblies so-called spin-valve structures are often used, for example.

FIG. 1a shows a schematic plan (top) view of an off-axis angle sensor system with three subunits or satellites (magneto-resistive angle sensors), wherein FIG. 1b shows a schematic elevation view of a similar off-axis angle sensor system with an even number of subunits (magneto-resistive angle sensors). As generally shown in FIGS. 1a and 1b, the magnet 103 may be smaller in the plan view (FIG. 1a) than in the elevation view (FIG. 1b), because its specific size is irrelevant for the inventive concept. In general, the magnet 103 may fit in-between the sensor units or it may overlap them in plan view or it may be even a ring that circumscribes the sensor units. For example, the magnet 103 may be a ring-magnet or a disk-magnet, it may be positioned above the sensor units (as shown in the elevation view of FIG. 1b) or it may be positioned below the sensor units or at the same axial position. The magnet 103 may even have non-rotational shape such as e.g. oval, square, rectangular or other shapes in plan view. It is also possible to mount several magnets to the rotating shaft e.g. above and below the sensor units or stacked in axial direction or interleaved wherein one magnet rests in the bore of a larger magnet or any combination thereof.

FIG. 1a shows a schematic plan view of a magnetic angle sensor system 100. The magnetic angle sensor system 100 of FIG. 1a comprises a shaft 102, a magnet 103 and silicon dies 106a-c having respectively mounted thereon a magnetic field sensor 108a-c (which can correspond to one of the magneto-resistive angle sensors 108 of FIGS. 5a-c as explained below). The magnet 103 with a bore 105 is mounted, e.g. on the through-shaft 102, wherein the angle sensors 108a-c are placed aside, i.e. off the rotation axis of the shaft, on the silicon die 106a-c.

The magnetic angle sensor system 100 uses several satellites or sensor sub-units 108a-c (see the magneto-resistive angle sensors 108# of FIGS. 3a-c as explained below), each of them is preferably on a single die 106a-c, and they are placed in a regular pattern, i.e. in an angular distance Δ=360°/N=120°) around the rotation axis z, e.g. at regular distance on a circle C which is orthogonal to the rotation axis z and concentric to the rotation axis z. Each satellite 108a-c samples the magnetic field essentially in a single test point 0, 1, 2, in the area of the angle sensors 108a-c. Here is an example of an off-axis sensor system 100 with three satellites (N=3).

FIG. 1b shows a schematic elevation view of the off-axis angle sensor 100 with, for example, an even number of satellites 108, wherein in case of an even number n of satellites, the test points of the different magneto-resistive angle sensors 108 are arranged diametrically opposite (inversely mirrored) with respect to the rotation axis z. As additionally shown in FIG. 1b, a vertical spacing d parallel to the z-rotation axis exists between the ring magnet 103 (fixed to the shaft 102) and the surface of the respective die 106a-n having the respective magneto-resistive angle sensors 100a-n arranged thereon. The magnet 103 is diametrically magnetized.

If the sensor elements are MRs, they have a reference direction: e.g. AMRs (anisotropic MRs) have the current direction as reference direction irrespective of the polarity of the current, GMRs (giant MRs) and TMRs (tunnelling MRs) have the direction of a magnetization in a pinned layer as reference direction whereby the pinned layer is a hard-magnetic material that is magnetized during fabrication and remains unchanged during operation provided that no unduly strong external magnetic field is applied thereto. In the schematic view in FIG. 1a (and also in the FIG. 2) the arrow next to the resistor denotes this reference direction in case of magneto-resistors with pinned layer. In case of magneto-resistors without pinned layer the reference directions are denoted by strokes "-", "|", "/", "\" inside the resistor symbols of FIG. 8.

Figure 2:
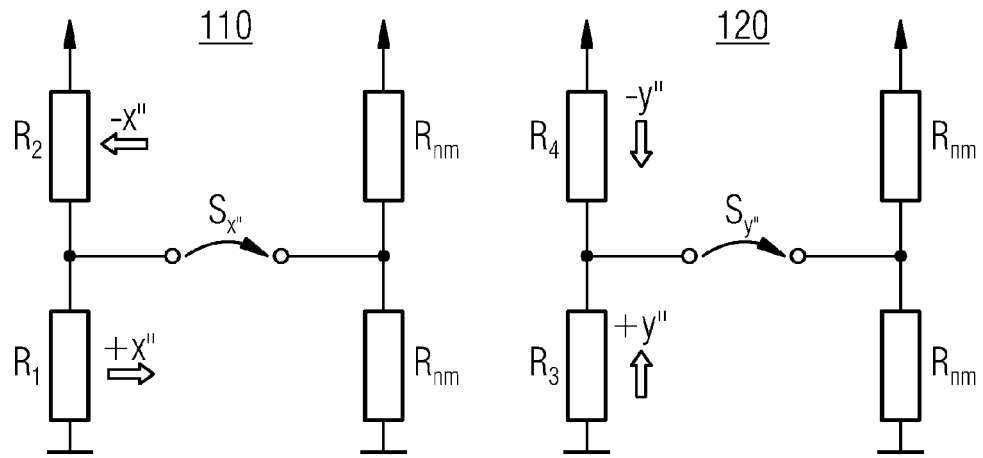
FIG. 2 shows a schematic view of a first and second half-bridge circuit comprising the magneto-resistive sensor elements of the magneto-resistive angle sensor according to an embodiment.
Figure 3:
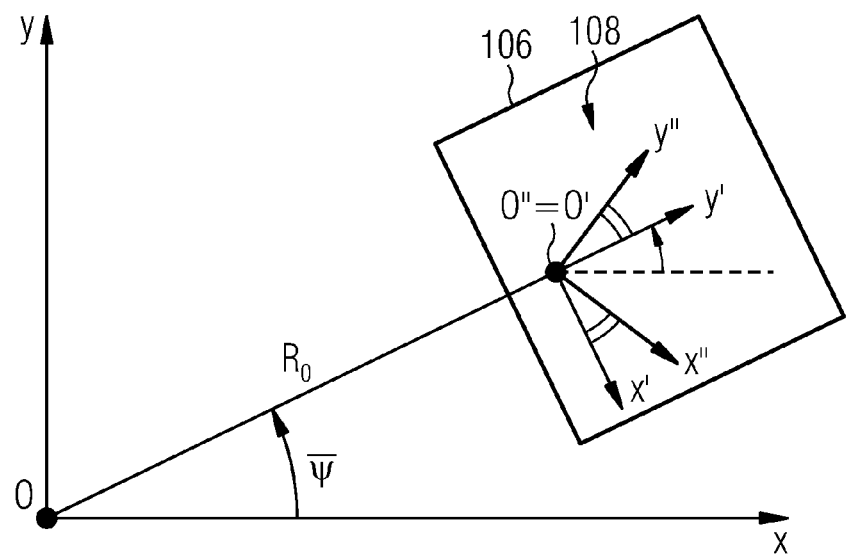
FIG. 3 shows an off-axis angle sensor system with respect to an example coordinate system.

In the sequel it is assumed that the die 106 of an arbitrary subsystem has a local reference frame (x',y'), which is related to the reference frame (x,y) of the total sensor system 100 as shown in FIG. 3: if a magnet is rotated around the z-axis its magnetic field moves along the tangential direction, which is parallel or anti-parallel to x'-direction. Consequently, y'-direction is parallel or anti-parallel to the radial direction. In practice it is convenient if x' is parallel to the horizontal direction in the layout and y' is parallel to the vertical direction in the layout, but this may be altered and is not to be understood as a necessary requirement for the disclosure. FIG. 3 shows a die 106 with an off-axis angle sensor 108 with respect to an example coordinate system, i.e. an off-axis angle sensor 108 with reference frame (x,y) and origin O (z axis) and satellite 108 with local reference frame (x',y') and origin O'. Furthermore it shows a second local coordinate system (x",y",z"), wherein z"=z' and (x",y",z") is rotated against (x',y',z') around the z"-axis by an arbitrary angle α. The second local coordinate system denotes the direction of magnetization of the magneto-resistive elements: if they comprise pinned layers their reference directions are one of the group of +x", -x", +y", -y" (see FIG. 2); if they comprise no pinned layers their reference directions are one of the group of x", y", and deviating by +/-45° from x" (see FIG. 8). In practice it may be convenient to have x'=x" and y'=y", for example, which means that both local coordinate systems (x',y',z') and (x",y",z") are identical. However, in general (x',y',z') may be different from (x",y",z"), because x'-direction denotes the direction of relative movement between sensor element and magnetic field whereas (x",y") denotes the reference directions of the magneto-resistive elements.

The following discussion is focused on an optimized layout of sensor elements, which leads to a minimization of angle errors. Although it was stated above that in principle each sub-unit 108 should sample the field in essentially a single test point, this is not the case in a strict sense. The reason is the finite size and shape of sensor elements. A typical MR-resistor has, for example, a rectangular size of about 50 μm×50 μm or 250 μm×250 μm or equivalent with aspect ratios of 0.1 to 10. Other shapes of similar area are also possible such as e.g. disks of diameter 56 μm or 282 μm or ovals with same area and aspect ratios of 0.1 to 10 and even further shapes are possible. Thus it is not possible to place two elements on the same (infinitely small) spot, wherein usually their position differs by at least the actual size, i.e. by at least 50 μm or more. If e.g. a chip is placed at a distance R0=8 mm to the rotation axis, then the displacement of 100 μm between two MR-resistors in tangential direction is equivalent to an angle of 0.1/10*180/pi=0.6°, which is not negligible if angles should be measured with an accuracy of about 0.5°. Thus the two MRs do not sample exactly the same field and this is found to cause significant errors in the measured rotational position of the magnet. This error is larger for off-axis angle sensors than for on-axis angle sensors, because the magnetic field is less homogeneous in the former.

The following discussion will provide appropriate design rules for the geometrical layout of angle sensor elements such that the angle errors of the resulting angle sensor can be minimized.

The following discussion is focused on the types of an off-axis XMR-angle sensor 100 as shown in FIGS. 1a-b, which has N≥3 sensor sub-units 108# that comprise at least one x"-half-bridge and at least one y"-half-bridge (see for example FIG. 2). The total system has N≥3 sub-units at angular positions n*360°/N with n=0, 1, . . . , N−1 on a reading circle c with radius R0=D/2, concentric to the rotation axis z. The magnet 103 may be diametrically magnetized, yet other magnetization patterns are also known such as Halbach types of magnetization or general multipolar magnetization in radial, axial, and azimuthal directions and combinations thereof.

Principally, there are multiple ways to construct the angular position of the magnet from the signals $S_{x''}$, $S_{y''}$ of the sub-units. One way is to compute arc tan 2($S_{x''}$, $S_{y''}$) of each sub-unit, which is a rough estimation of the angle, then to add or subtract 360° to the angles until the angles of all sub-units are ascending or descending if one lines up the sub-units clock-wise, and finally to compute the average of these values and add or subtract 360° until the result is in the range between 0° and 360°. Another way is to compute the spatial Fourier transform of all signals $S_{x''}$ and to equate the angular position of the magnet as the arc tan 2 of real and imaginary parts of the fundamental harmonic of this Fourier transform. There are probably even other possibilities to compute the angle. A point is, that the exact algorithm used for this computation is irrelevant or insignificant for the inventive concept, wherein it only counts that the signals $S_{x''}$, $S_{y''}$ are sampled by magneto-resistive elements MRs, which subtend certain extended areas on the die 106.

GMR elements and TMR elements have resistances that depend on the magnetic field in the following way, wherein a resistor with a direction of magnetization of the pinned layer in positive x" direction varies according to:

$$R_{MRx''} = R_{ref}\left(1 + h\cos\angle(\vec{B}_{in-plane}, \vec{n}_{x''})\right) = R_{ref}\left(1 + h\frac{\vec{B}_{in-plane} \cdot \vec{n}_{x''}}{|\vec{B}_{in-plane}|}\right) = R_{ref}\left(1 + h\frac{B_R\vec{n}_R + B_\psi\vec{n}_\psi}{\sqrt{B_R^2 + B_\psi^2}} \cdot \vec{n}_{x''}\right);$$

wherein "$R_{ref}$" is a reference resistance value in the order of a few hundred Ohms to a few kilo-Ohms, "h" is roughly 0.05 for GMRs and about 0.3 to 0.5 for TMRs, "$\vec{B}_{in-plane}$" is the projection of the magnetic field on the surface onto which the XMR is sputtered, "$B_R$, $B_\psi$" are radial and azimuthal component of the magnetic field in circular cylindrical coordinates with z-axis identical to the rotation axis, and "$\vec{n}_{x''}$" is the unit vector in positive x" direction. A resistor with direction of magnetization of pinned layer in positive y" direction varies according to:

$$R_{MRy''} = R_{ref}\left(1 + h\cos\angle(\vec{B}_{in-plane}, \vec{n}_{y''})\right) = R_{ref}\left(1 + h\frac{\vec{B}_{in-plane} \cdot \vec{n}_{y''}}{|\vec{B}_{in-plane}|}\right) = R_{ref}\left(1 + h\frac{B_R\vec{n}_R + B_\psi\vec{n}_\psi}{\sqrt{B_R^2 + B_\psi^2}} \cdot \vec{n}_{y''}\right)$$

If the direction of magnetization of pinned layer is reversed this means that we can multiply "h" by (−1) in these two equations.

It is referred to FIG. 2, which shows a first half bridge circuit (left side) with magneto-resistive sensor elements R1, R2 having +/−x" reference directions. The first half-bridge circuit (R1, R2—left part) comprises the two magneto-resistive (MR) sensor elements R1, R2 with reference directions +x" and −x". The voltage divider at the right side is composed of non-magnetic resistors $R_{nm}$, $R_{nm}$ and may be placed anywhere (its precise location is not relevant for the angle error). A first angle signal $S_{x''}$ is tappable between the center tap of the first half bridge circuit and the center tap of the voltage divider consisting of the two non-magnetic resistors $R_{nm}$, $R_{nm}$.

FIG. 2 further shows a second half bridge circuit (right side) with magneto-resistive sensor elements R3, R4 having the +/−y" reference directions. The +/−y" directions are orthogonal to the +/−x" directions. The second half-bridge circuit (R3, R4—left part) comprises the two magneto-resistive (MR) sensor elements R3, R4 with reference directions +y" and −y". The voltage divider at the right side is composed of non-magnetic resistors $R_{nm}$, $R_{nm}$ and may be placed anywhere (its precise location is not relevant for the angle error). A second angle signal $S_{y''}$ is tappable between the center tap of the second half bridge circuit and the center tap of the voltage divider consisting of the two non-magnetic resistors $R_{nm}$, $R_{nm}$.

The magneto-resistive sensor elements R1, R2 and R3, R4 sense the cosine of an angle between their reference direction and the projection of the magnetic field vector into the (x",y")-plane, respectively.

Figure 4:
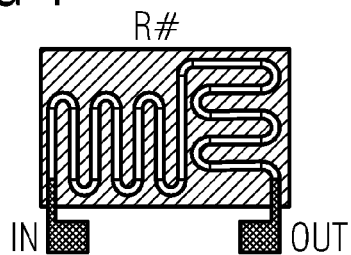
FIG. 4 shows a typical shape of a single magneto-resistive sensor element.

An example and typical shape of a magneto-resistive element with pinned magnetization (MR) R# is given in FIG. 4. Assuming that the typical layout of magneto-resistive sensor elements with pinned magnetization (e.g. GMR or TMR elements) is composed of two orthogonal meanders, wherein the meanders cover a rectangular area. Moreover, a possible layout of magneto-resistive sensor elements without pinned magnetization (e.g. AMR elements) comprises an AMR resistor stripe (e.g. with a so-called barber pole configuration).

A generalization of this geometry of a magneto-resistive sensor element can be assumed, wherein the geometrical layout of a magneto-resistive sensor element with or without pinned magnetization has an elongated shape which is folded such as to essentially fill up a rectangular area. This geometrical layout can be achieved via meanders, spirals and/or less symmetric shapes of the elongated laminate structure of the magneto-resistive elements. This geometrical layout of FIG. 4 is chosen to achieve a large resistance within a small area, wherein a thin stripe is used that is folded such as to fill up the area.

Instead of a stripe, small discs may be used which slightly overlap so that it looks like pearls on a string. Such a string may as well be used and it may also be folded similarly into meanders like the stripe in FIG. 4. In principle any small shape can be used instead of the small discs and these shapes can slightly overlap their neighbors so as to constitute a string along which the current can flow. Even more generally several strings or strips can be used to constitute a mesh structure, which is basically a simple mixture of parallel- and serial-connected branches. So the long meander is just an extreme case of a mesh with no parallel connected branches, which maximizes the resistance in a given area— if the sheet resistance of the element is large enough one may readily use one or more parallel connected branches to reduce the resistance again. All these types of meanders and meshes fill up a two-dimensional shape (here exemplarily a rectangle) homogeneously.

However, the present disclosure is not limited to magneto-resistive sensor elements having two meanders in a single pinned layer rectangle. Moreover, if the application does not necessitate to cancel the AMR-effect (because it is negligible compared to a much larger TMR-effect) it is, for example, possible to also use single meander directions in each pinned layer rectangle. For magneto-resistive sensor elements without pinned layer it is also possible to use a single direction of meanders, because there one does not need to cancel the AMR-effect, because it is the only effect present in the device.

In this context it is pointed to the fact, that for magneto-resistive sensor elements with pinned layer it is not possible to use inter-digital layout techniques like for input pairs of transistors of operational amplifiers or current mirrors, because each resistor has a different reference direction, e.g. R1 has the reference direction in positive x"-direction (in the layout from left to right) while R2 has the reference direction of magnetization of pinned layer in negative x"-direction (in the layout from right to left). The pinned layers are magnetized by exposing it to a large applied field in the order of 1T and heating the element up to more than 250° C. (over the respective blocking temperature during laser writing depending on the exact material composition and layer thicknesses). The heating up is supported, for example, by a laser beam onto the rectangular area. Thereby other rectangular areas for different directions of magnetization of pinned layers must not be heated up in one embodiment in order not to change their magnetization of pinned layer.

Obviously this procedure also sets a lower bound for the size and spacing of neighboring pinned layers. If the neighboring pinned layers are located too close the laser heating will have marked thermal cross-talk and this will deteriorate the magnetization of some pinned layers.

So in practice, a trade-off is looked for, in order to have low angle errors one would have to reduce the size and spacing of the MRs, yet on the other hand the errors of individual magneto-resistive sensor elements MRs increase at too small spacing due to imperfect magnetization of pinned layers.

An analytical calculation of the effect of finite size and shape of MRs on the angle error for off-axis angle sensors can be done based on different calculation methods arriving at the following set of rules/requirements for the layout:

The magnetic field of a permanent magnet can be expanded into a Taylor series on the location of the sensor elements. The effect of field inhomogeneity can be accounted for by computing the magnetoresistive response locally and integrating over the entire shape of the magnetoresistor (magneto-resistive sensor element). This integration account for the fact that the magneto-resistive sensor element subtends its entire shape essentially homogeneously. If this is done for all magnetoresistors of a bridge circuit the output signal is obtained as a function of magnetic field inhomogeneity and geometry of sensor elements. Finally the error propagation into the estimated angle can be computed. It turns out that dominant portions of angle error vanish if the layout of the magnetoresistive sensor elements complies to the following rules and requirements:

Requirement #1: $\overline{x}'_1 = \overline{x}'_2$
Requirement #2: $\overline{x}'_3 = \overline{x}'_4$
Requirement #3: $I'_{xx,1} - I'_{xx,2} + I'_{xy,3} - I'_{xy,4} = 0$
Requirement #4: $I'_{xx,3} - I'_{xx,4} - I'_{xy,1} + I'_{xy,2} = 0$
Requirement #5: $\overline{y}'_1 = \overline{y}'_2$ (optional)
Requirement #6: $\overline{y}'_3 = \overline{y}'_4$ (optional).

Whereby the index 1, 2, 3, 4 refers to resistance R1, R2, R3, R4. Resistances R1 and R2 have directions of magnetization of pinned layers as shown in the left half-bridge circuit of FIG. 2, wherein resistances R3 and R4 have directions of magnetization of pinned layers as shown in the right half-bridge circuit of FIG. 2, whereby it is pointed out that the reference system (x",y") may be rotated against (x',y') by an arbitrary angle. The position and orientation of the die versus rotation axis is preferably according to FIG. 3.

In particular, the x' direction is parallel to the relative direction of movement of the sensor elements against the magnetic field.

The x'-coordinate of the gravity center of resistor #1 (R1) is $$\overline{x}'_1 = \frac{1}{A_1} \int_{A_1} x' y' dA,$$

whereby the integration subtends the entire area $A_1$ which is covered by resistor #1 (R1). This definition shows that by "gravity center" we denote the geometrical gravity center irrespective of the mass distribution inside the sensor element.

The y'-coordinate of the gravity center of resistor #1 (R1) is $$\overline{y}'_1 = \frac{1}{A_1} \int_{A_1} y' dA.$$

The deviation moment of resistor #1 (R1) is given by $$I'_{xy,1} = \frac{1}{A_1} \int_{A_1} x' y' dA$$

The deviation moment depends on both x'- and y'-axes. The moment of inertia around the y'-axis of resistor #1 (R1) is given by $$I'_{xx,1} = \frac{1}{A_1} \int_{A_1} x'^2 dA.$$

Analogously, the other indices 2, 3, 4 refer to resistors #2 (R2), #3 (R3), and #4 (R4). The preceding two definitions show that, by "deviation moment" and "inertia moment", the geometrical deviation moment and the geometrical inertia moment, respectively, is denoted irrespective of the actual mass distribution inside the sensor element.

An optimized compromise for the geometrical layout satisfies requirements #1, #2, #3, #4 simultaneously, whereby the magnitudes $|\overline{y}'_1-\overline{y}'_2|$ and $|\overline{y}'_3-\overline{y}'_4|$ should be small (if these magnitudes vanish we have the perfect layout). Thereby $|\overline{y}'_1-\overline{y}'_2|$ is called small if it holds $|\overline{y}_1-\overline{y}_2|<0.3\times(|\overline{y}_1|+|\overline{y}_2|)/2$, in other words "small" is defined as being smaller in magnitude as 30% of the average of magnitudes of both subtrahend and minuend.

Finally the rule for further optimized layout is, when the further optimized layout satisfies the requirements #1, #2, #3, #4, #5, #6 simultaneously.

In the context of the present disclosure, the inertia moments $I'_{xx}$, $I'_{yy}$ are denoted as axial inertia moments. The inertia moment $I'_{xy}$ is denoted as the deviation moment (or bi-axial inertia moment). The axial inertia moments are always positive in one embodiment. The deviation moment may be positive, negative or zero. The deviation moment is zero if one of the axes is a symmetry axis.

Furthermore, it is pointed out to the fact that in the context of the present disclosure, it is indicated for defining some inventive aspects that specific quantities or values coincide (are identical), vanish (are about zero) and so on. However, it should become clear that due to different fabrication tolerances, different tolerance ranges may exist for the different values or quantities as defined in the present application, and especially in the set of claims. The tolerance range for the different quantities or the possible deviation between different quantities as indicated in the present application and especially in the set of claims can, for example, be less than 10%, 5% or 3% and should be as low as possible. In detail requirement #1 says $\overline{x}'_1=\overline{x}'_2$, which is identical to the requirement that the sum of positive $\overline{x}'_1$ and negative $\overline{x}'_2$ vanishes: $\overline{x}'_1-\overline{x}'_2=0$. In practice the magnitudes of $\overline{x}'_1$ and $\overline{x}'_2$ are in the order of 10 μm to 500 μm as explained above. It is clear that a system with $\overline{x}'_1-\overline{x}'_2\approx 1$ μm is nearly as good as a perfect system with $\overline{x}'_1-\overline{x}'_2=0$, because the 1 μm is much smaller than the 10 . . . 500 μm. So the mathematical equation $\overline{x}'_1-\overline{x}'_2=0$ should be interpreted in practice as $\overline{x}'_1-\overline{x}'_2\approx 0$. In order to be more definite and precise we define: $\overline{x}'_1-\overline{x}'_2\approx 0$ means $|\overline{x}'_1-\overline{x}'_2|<0.3\times(|\overline{x}'_1|+|\overline{x}'_2|)/2$. In words: A sum or subtraction of several terms is defined to vanish in an approximate sense if its magnitude is smaller than 30%, 20% or 10% of the average of magnitudes of the individual terms.

This interpretation can also be applied to requirements #2 . . . 6. E.g. requirement #4 says $I'_{xx,1}-I'_{xx,2}+I'_{xy,3}-I'_{xy,4}=0$, which has the practical meaning (or one may say it is just a short-hand notation of):

$$|I'_{xx,1}-I'_{xx,2}+I'_{xy,3}-I'_{xy,4}| < 0.3 \times \frac{|I'_{xx,1}-I'_{xx,2}+I'_{xx,3}-I'_{xx,4}|}{4}$$

Figure 5A:
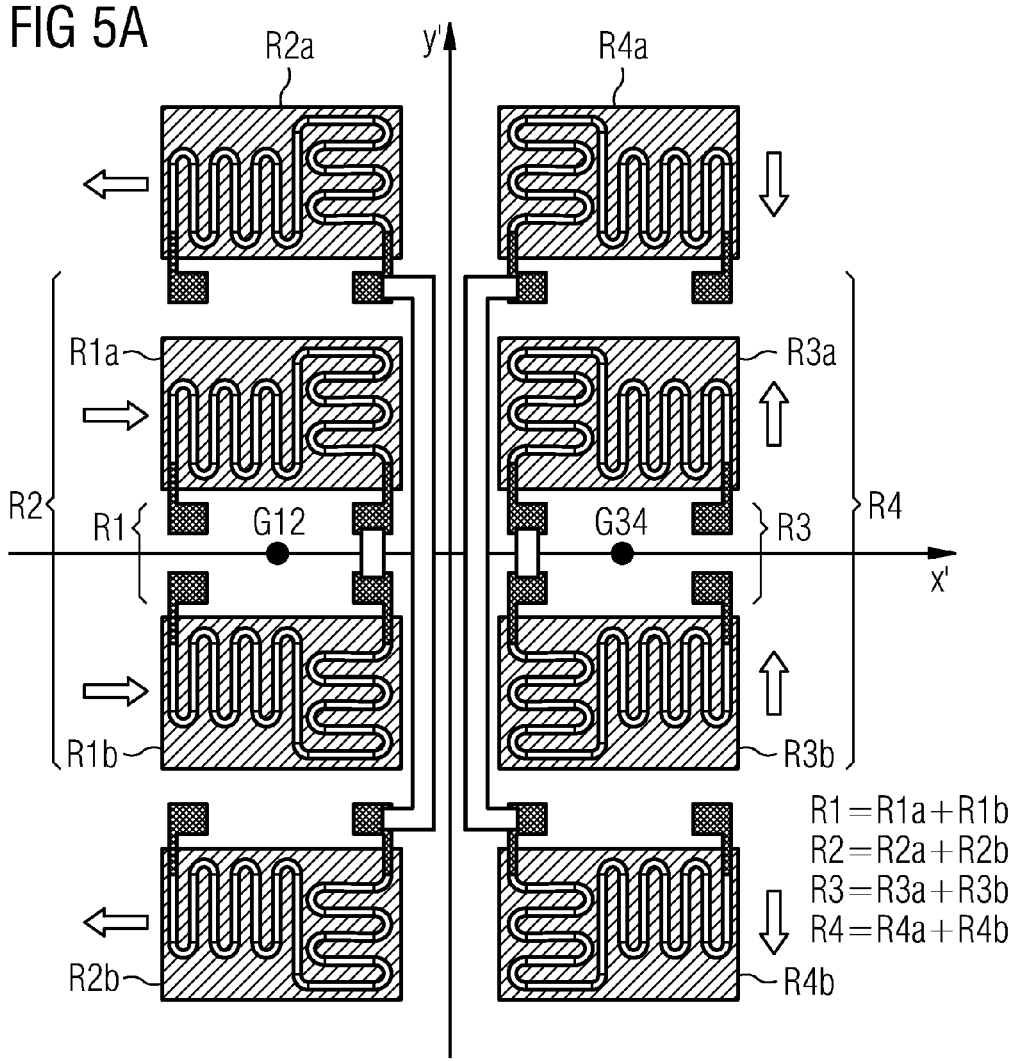
FIG. 5a shows a schematic view of a geometrical layout of a magneto-resistive angle sensor according to an embodiment.
Figure 5B:
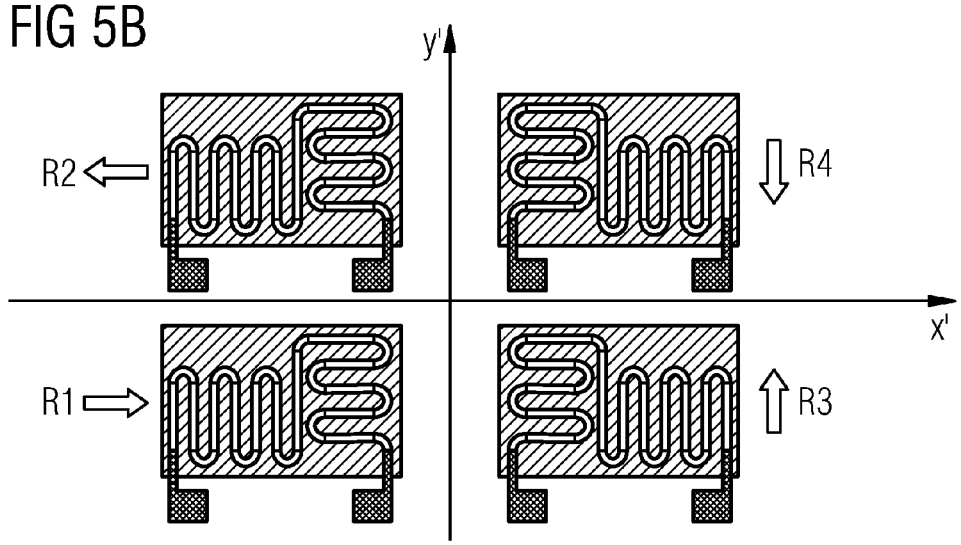
FIG. 5b shows a schematic plan view of the geometrical layout of a magneto-resistive angle sensor according to a further embodiment.
Figure 5C:
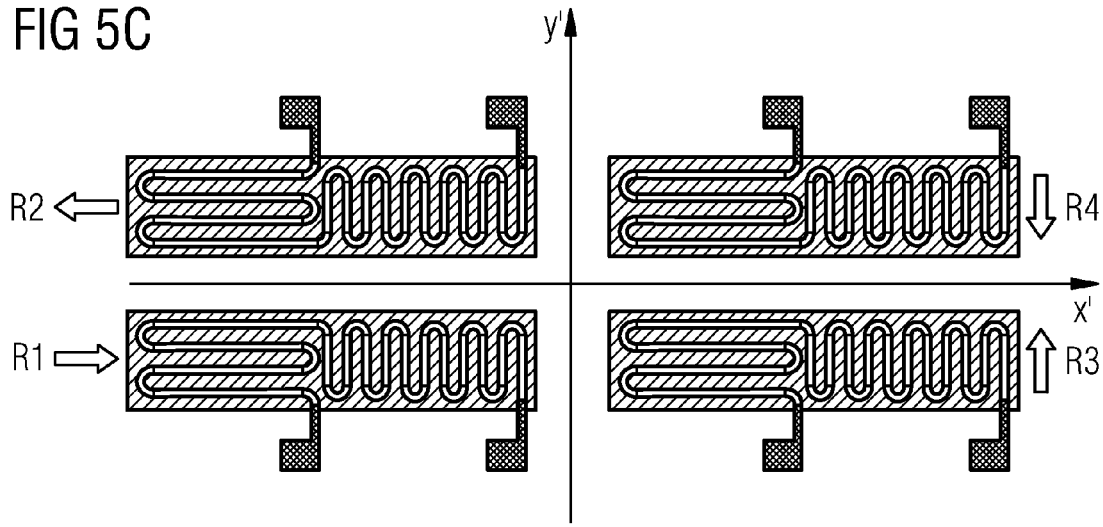
FIG. 5c shows a schematic plan view of the geometrical layout of a magneto-resistive angle sensor according to a further embodiment.

In the following, the sensor arrangements as shown in FIGS. 5a-c each represents a possible and example geometrical layout of a magneto-resistive angle sensor with various symmetry conditions, which meet the above requirements #1 to #4 (and optionally #5 and #6). However, different geometrical layouts of a magneto-resistive angle sensor having other symmetry conditions as shown in FIGS. 5a-c may also meet all above requirements #1 to #4 (and optionally #5 and #6), so that it should be noted that the above requirements #1 to #4 (and optionally #5 and #6) define the inventive concept, rather than the specific symmetry conditions of the geometrical layout of the sensor arrangements as shown in FIGS. 5a-c.

FIG. 5a shows a schematic view of a geometrical layout of a magneto-resistive angle sensor 108 according to an embodiment, wherein FIG. 2 shows the schematic view of a first and second half-bridge circuit 110, 120 comprising the magneto-resistive sensor elements R1, R2, R3, R4 of the magneto-resistive angle sensor 108 according to the first embodiment.

To be more specific, FIG. 5a shows eight magneto-resistive sensor element structures R1a-b, R2a-b, R3a-b, R4a-b which are arranged symmetrically with respect to a local reference frame x',y' (coordinate system), wherein the first axis x' is parallel to the horizontal direction in the layout and the second axis y' is parallel to the vertical direction in the layout. The reference directions of sensor elements are also shown to be parallel to x' and y' axes, however, it should be noted that all of them could be rotated arbitrarily by some arbitrary angle without impairing the angle sensor.

The eight magneto-resistive sensor element structures R1a-b, R2a-b, R3a-b, R4a-b are arranged symmetrically pairwise with respect to the x' axis, wherein the magneto-resistive sensor element structures R1a-b and R3a-b and the magneto-resistive sensor element structures R2a-b and R4a-b are symmetrically arranged to each other with respect to the y' axis.

The magneto-resistive sensor element structures R1a-b, R2a-b, R3a-b, R4a -b each show a layout (in a plan view), which is composed of two orthogonal meanders, whereby the meanders cover a rectangular area. In the following it is referred to a generalization of this geometry, where the geometrical MR-layout has an elongated shape which is folded such as to essentially fill up a rectangular area. This geometry of the respective magneto-resistive sensor element structures R1a-b, R2a-b, R3a-b, R4a -b can be achieved via meanders or spirals or less symmetric shapes.

As shown in FIG. 5a, the magneto-resistive sensor element structures R1a-b, R2a-b, R3a-b, R4a-b are selectively connected so that the magneto-resistive sensor element structures R1a-b form the magneto-resistive sensor elements R1, the magneto-resistive sensor element structures R2a-b form the magneto-resistive sensor elements R2, the magneto-resistive sensor element structures R3a-b form the magneto-resistive sensor elements R3, and the magneto-resistive sensor element structures R4a-b form the magneto-resistive sensor elements R4.

According to the layout in FIG. 5a, the magneto-resistive (MR) sensor elements R1, R2, R3, R4 are connected to half bridges according to FIG. 2, whereby in FIG. 5a the connection between R1 and R2 is not explicitly shown (any of the two terminals of R1 can be connected to any of the two terminals of R2). Also the connection between R3 and R4 is not explicitly shown (any of the two terminals of R3 can be connected to any of the two terminals of R4). Each magneto-resistive (MR) sensor element R1, R2, R3, R4 is split up in two parts (i.e. the magneto-resistive sensor element structures R1a-b, R2a-b, R3a-b, R4a-b) and the two parts are connected by thick grey lines, which could be aluminum wires on chip-level. The magneto-resistive sensor element structures R1a-b, R2a-b, R3a-b, R4a-b have a shaded rectangle, which represents the pinned layer. The direction of magnetization of the pinned layer is denoted by an arrow left or right to the shaded rectangle. The indicated directions are consistent with FIG. 2. Within each shaded rectangle there are two orthogonal meanders, the two meanders are used to cancel the AMR-effect in the net resistance.

As indicated above, FIG. 2 shows the first half bridge circuit with magneto-resistive sensor elements R1, R2 having the +/−x" reference directions and for providing the first angle signal $S_{x'}$. The first half-bridge circuit (R1, R2—left part) comprises the two magneto-resistive sensor elements R1, R2 with reference directions +x" and −x". FIG. 2 further shows the second half bridge circuit with magneto-resistive sensor elements R3, R4 having the +/−y" reference directions and for providing the second angle signal $S_{y'}$. The second half-bridge circuit (R3, R4—left part) comprises the two magneto-resistive (MR) sensor elements R3, R4 with reference directions +y" and −y".

Thus, the magneto-resistive angle sensor 108 comprises a first half bridge circuit 110 comprising a first magneto-resistive element (magneto-resistor) R1 with a first reference direction (i.e. with a first direction of magnetization of the pinned layer) parallel to a first axis (x"-axis) in a first direction x", and a second magneto-resistive element R2 with a second reference direction anti-parallel to the first axis in the first direction x", i.e. in the x" direction. The magneto-resistive angle sensor 100 further comprises a second half bridge circuit 120 having a third magneto-resistive element R3 with a third reference direction parallel to a second axis (y"-axis) in a second direction y", and a fourth magneto-resistive element R4 with a fourth reference direction anti-parallel to the second axis in the second direction y", i.e. in the −y" direction.

The first and the second magneto-resistive elements R1, R2 of the first half bridge circuit R1-2 have an identical x'-coordinate (Requirement #1: $\bar{x}'_1 = \bar{x}'_2$).

The third and fourth magneto-resistive elements R3, R4 of the second half bridge circuit R3-4 have an identical x'-coordinate (Requirement #2: $\bar{x}'_3 = \bar{x}'_4$).

Moreover, the sum of the value of the inertia moment $I'_{xx,1}$ (i.e. the geometrical moment of inertia) of the first magneto-resistive element R1 around the y'-axis, the negative value of the inertia moment $I'_{xx,2}$ of the second magneto-resistive element R2 around the y'-axis, the value of the deviation moment $I'_{xy,3}$ of the third magneto-resistive element R3 and the negative value of the deviation moment $I'_{xy,4}$ of the fourth magneto-resistive element R4 "vanishes" (or is about zero) (Requirement #3):

$$I'_{xx,1} - I'_{xx,2} + I'_{xy,3} - I'_{xy,4} = 0$$

Further, the sum of the value of the inertia moment $I'_{xx,3}$ of the third magneto-resistive element R3 around the y'-axis, the negative value of the inertia moment $I'_{xx,4}$ of the fourth magneto-resistive element R4 around the y'-axis, the negative value of the deviation moment $I'_{xy,1}$ of the first magneto-resistive element R1 and the value of the deviation moment $I'_{xy,2}$ of the second magneto-resistive element $I'_{xx,2}$ vanishes (or is about zero) (Requirement #4):

$$I'_{xx,3} - I'_{xx,4} - I'_{xy,1} + I'_{xy,2} = 0$$

Optionally, in the magneto-resistive angle sensor 100, the y'-coordinates $\bar{y}'_1$, $\bar{y}'_2$ of the geometrical gravity centers of the first and the second magneto-resistive elements R1, R2 of the first half bridge circuit R1-2 may be identical (optional Requirement #5):

$$\bar{y}'_1 = \bar{y}'_2.$$

Moreover the y-coordinates $\bar{y}'_3$, $\bar{y}'_4$ of the geometrical gravity centers of the third and fourth magneto-resistive elements R3, R4 of the second half bridge circuit R3-4 may be identical (optional Requirement #6):

$$\bar{y}'_3 = \bar{y}'_4.$$

As shown in FIG. 5a, the first direction x' and the second direction y' are orthogonal to each other.

In other words, FIG. 5a shows the layout of the magneto-restive sensor elements R1-R4 (MRs—magneto-resistors #1, #2, #3, #4), which are connected to half bridges according to FIG. 2 yet this connection is not shown here. Each MR is split up in two parts and the two parts are connected by thick grey lines, which could be aluminum wires on chip-level. Each part has a shaded rectangle, which represents the pinned layer. However other shapes than rectangles may as well be used. The direction of magnetization of the pinned layer is denoted by an arrow left or right to the shaded rectangle. The indicated directions are consistent with FIG. 2. In FIG. 5a the arrows point in positive or negative x'- or y'-direction, however, it is also allowed to rotate them by some arbitrary angle. Therefore we denote them with x"- and y"-directions, that may be different from x'- and y'-directions namely rotated against each other as shown in FIG. 3. Within each shaded rectangle there are two orthogonal meanders—the two meanders are used to cancel the AMR-effect in the net resistance.

The gravity centers of resistor #1 and resistor #2 may be identical (i.e. congruent) and labeled by $G_{12}$ in the figure. Thus requirements #1 and #5 are both fulfilled. The gravity centers of resistor #3 and resistor #4 may be identical (i.e. congruent) and labeled by $G_{34}$ in the figure. Thus requirements #2 and #6 are both fulfilled.

The moments of inertia around y'-axis of resistors #1 and #2 are identical:

$$I'_{xx,1} - I'_{xx,2} = 0.$$

Also the moments of inertia around y'-axis of resistors #3 and #4 are identical:

$$I'_{xx,3} - I'_{xx,4} = 0.$$

The deviation moment of each resistor vanishes due to symmetry:

$$I'_{xx,1} - I'_{xx,2} \times I'_{xy,3} = I'_{xy,4} = 0$$

Consequently requirements #3 and #4 are also fulfilled.

Therefore, the layout is at least optimized or (nearly) perfect in a sense that the finite extensions and different positions of the MRs do not produce any error in the measured angular position of the magnet obtained from the signals of the MR half-bridges.

However, it should be noted that magneto-resistive sensor elements having a different design than two meanders in a single pinned layer rectangle can be used. The magneto-resistive sensor stripe may be folded like an irregular snake inside any two-dimensional shape like a rectangle, a disk, an oval, a half-moon, a polygon. Moreover, if the application does not necessitate to cancel the AMR-effect (because it is negligible compared to a much larger TMR-effect) it is, for example, possible to also use single meander directions in each pinned layer rectangle.

Moreover, it is possible to join the two pinned layer rectangles of the two parts of resistance #1 (R1 of FIG. 5a). This may even allow for lower spacing in y'-direction between both rectangles which is beneficial to reduce angle errors caused by size and shape anyhow.

FIG. 5b shows a schematic plan view of the geometrical layout of a magneto-resistive angle sensor 108 according to a further embodiment, wherein the magneto-resistive angle sensor 108 also fulfills the above requirements #1 to #4. Moreover, the magneto-resistive angle sensor 108 is advantageous in that a laser can heat up the respective magneto-restive sensor elements R1-R4 with a single spot, because of the "stand-alone" and separate layout of the magneto-resistive sensor elements R1-R4.

To be more specific, FIG. 5b shows four magneto-resistive sensor elements R1, R2, R3, R4 which are arranged symmetrically with respect to a local reference frame x',y' (coordinate system). Optionally, the first axis x' is parallel to the horizontal direction in the layout and the second axis y' is parallel to the vertical direction in the layout. Thereby the connection between the resistors are not shown. Any contact of R1 may be connected to any contact of R2 in order to make a first half-bridge circuit, whereby this connection point serves as output and the other two remaining contacts of R1 and R2 serve as positive and negative supply terminal. Analogously any contact of R3 may be connected to any contact of R4 in order to make a second half-bridge circuit, whereby this connection point serves as output and the other two remaining contacts of R3 and R4 serve as positive and negative supply terminal.

The magneto-resistive sensor elements R1, R2 and R3, R4 are arranged symmetrically pairwise with respect to the x' axis, wherein the magneto-resistive sensor elements R1, R3 and R2, R4 are arranged symmetrically pairwise with respect to the y' axis.

The magneto-resistive sensor elements R1, R2, R3, R4 each show a layout (in a plan view), which is composed of two orthogonal meanders, whereby the meanders cover a rectangular area. In the following it is referred to a generalization of this geometry, where the MR-layout has an elongated shape which is folded such as to essentially fill up a rectangular area. This geometry of the respective magneto-resistive sensor elements R1, R2, R3, R4 can be achieved via meanders or spirals or less symmetric shapes.

Again referring to FIG. 2, there is shown a schematic view of a first and second half-bridge circuit 110, 120 comprising the magneto-resistive sensor elements R1, R2, R3, R4 of the magneto-resistive angle sensor 108 according to the further embodiment.

The magneto-resistive sensor elements R1, R2, R3, R4 have a shaded rectangle, which represents the pinned layer. The direction of magnetization of the pinned layer is denoted by an arrow left or right to the shaded rectangle. The indicated directions are consistent with FIG. 2. Within each shaded rectangle there are two orthogonal meanders, wherein the two meanders are used to cancel the AMR-effect in the net resistance.

In other words, the magneto-resistive sensor elements R1, R2, R3, R4 of FIG. 5b are made up by only one pinned-layer rectangle with some meanders that subtend the rectangle essentially homogeneously (whereby the exact shape of the meander is irrelevant for the concept). The two resistors R1 and R2 of the x"-half bridge have identical x'-coordinate of gravity center, yet different y'-coordinates. Also the two resistors R3 and R4 of the y"-half bridge have identical x'-coordinate of gravity center, yet different y'-coordinates.

The (optional) requirements #5 and #6 are not fulfilled. Yet all other requirements #1, #2, #3, #4 are fulfilled due to symmetry and this is enough to cancel the dominant parts of the angle error caused by finite size-effects of the MRs. Moreover it is possible to optimize the magnet is such a way that it does not produce angle errors in spite of requirements #5 and #6 being not fulfilled.

FIG. 5c shows a schematic plan view of the geometrical layout of a magneto-resistive angle sensor 108 according to a further embodiment, wherein the magneto-resistive angle sensor 108 also fulfills the above requirements #1 to #4.

In the magneto-resistive angle sensor 108, the extension of the first, second, third and fourth magneto-resistive elements R1, R2, R3, R4 in the first x' direction is larger by at least a factor of two than in the second direction. The x' direction is parallel to the relative direction of movement of the sensor elements. Also here the arrows denoting the reference directions may be rotated by an arbitrary angle Again referring to FIG. 2, there is shown a schematic view of a first and second half-bridge circuit 110, 120 comprising the magneto-resistive sensor elements R1, R2, R3, R4 of the magneto-resistive angle sensor 300 according to the second embodiment.

In other words, the magneto-resistive elements R1, R2, R3, R4 of the magneto-resistive angle sensor 108 according to FIG. 5c comprise an increased aspect ratio of the rectangles of the MRs (when compared to the magneto-resistive elements R1, R2, R3, R4 of the magneto-resistive angle sensor 108 according to FIG. 5b) so that the magneto-resistive elements R1, R2, R3, R4 of the magneto-resistive angle sensor 108 according to FIG. 5c cover smaller y-regions and this will lead to a reduction in $|\bar{y}'_1-\bar{y}'_2|$ and $|\bar{y}'_3-\bar{y}'_4|$ which also reduces associated angle errors.

As an alternative implementation, the magneto-resistive sensor elements R1 and R2 may also be turned by 180° around their geometrical gravity centers so that the horizontal portions of the meanders are closer to the y'-axis, yet this does not change the angle error notably.

The first, second, third and fourth magneto-resistive elements R1, R2, R3, R4 of the magneto-resistive angle sensor 108 may be located on the same semiconductor die 106. The magneto-resistive sensor elements are, for example, GMR elements or TMR elements.

Above, angle sensors 108 with half-bridge circuits 110, 120 are discussed.

Figure 6:
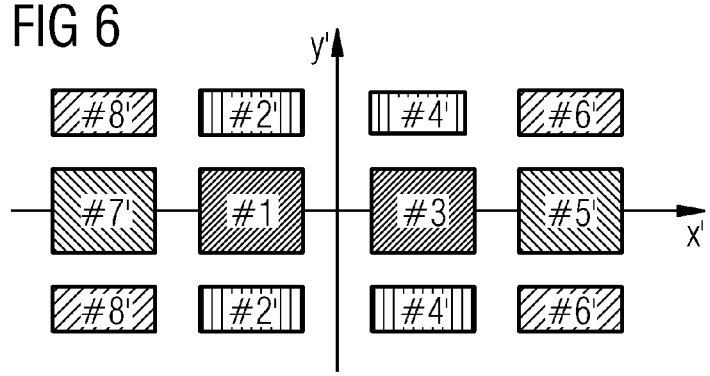
FIG. 6 shows a schematic plan view of the geometrical layout of a magneto-resistive sensor according to a further embodiment.
Figure 7:
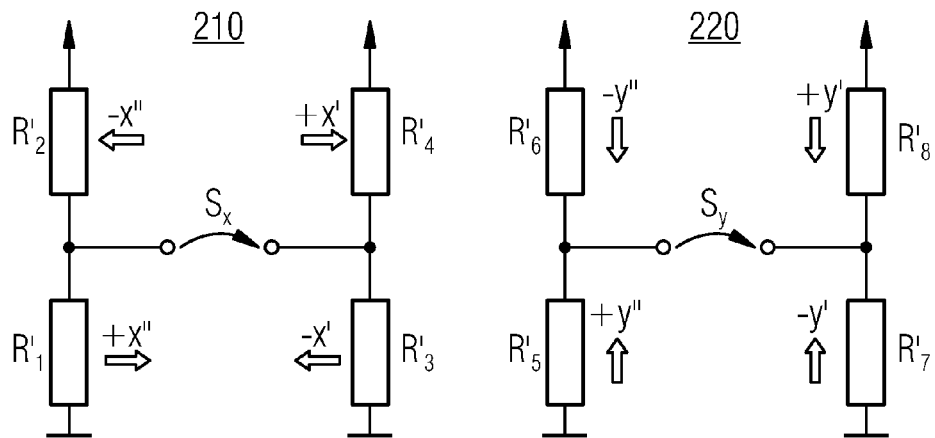
FIG. 7 shows a schematic view of two full-bridge circuits with the eight magneto-resistive sensor elements for the magneto-resistive angle sensor of FIG. 6.

According to a further embodiment, FIG. 6 shows a schematic plan view of the geometrical layout of a magneto-resistive sensor according to a further embodiment, wherein FIG. 7 shows a schematic view of two full-bridge circuits with the eight magneto-resistive sensor elements for the magneto-resistive angle sensor of FIG. 6.

In the following, angle sensors 208 with half-bridge circuits 210, 220 are discussed, wherein thereby one or both half-bridge circuits are replaced by the following full-bridge circuits as shown in FIGS. 6 and 7.

As shown in FIGS. 6 and 7, the numbering R'1-R'4 indicates the magneto-resistors #1'-#4' of the x"-full-bridge circuit (FIG. 6a—left side), whereas the numbering R'5-R'8 indicates the magneto-resistors #5'-#8' are part of the y"-full-bridge circuit (FIG. 6a—right side).

FIG. 7 shows a first full-bridge circuit 210 (left side), which comprises the four magneto-resistive (MR) sensor elements R'1-R'4 with reference directions +x" and −x". A first angle signal $S_{x''}$ is tappable at the center taps of the first full-bridge circuit. FIG. 7 further shows a second full-bridge circuit 220 (right side) which comprises the two magneto-resistive (MR) sensor elements R'5-R'8 with reference directions +y" and −y". A second angle signal $S_{y''}$ is tappable at the center taps of the second full-bridge circuit.

One way to reduce angle errors caused by finite size and shape of MRs in such a system is to fulfill the following set of requirements:

Requirement #1: $\bar{y}'_1=\bar{y}'_2=\bar{y}'_3=\bar{y}'_4=\bar{y}'_5=\bar{y}'_6=\bar{y}'_7=\bar{y}'_8=0$ Requirement #2: $I'_{xx,1}=I'_{xy,2}=I'_{xy,3}=I'_{xy,4}=I'_{xy,5}=I'_{xy,6}=I'_{xy,7}=I'_{xy,8}=0$ Requirement #3: $\bar{x}'_1=\bar{x}'_2=-\bar{x}'_3=-\bar{x}'_4$ Requirement #4: $\bar{x}'_5=\bar{x}'_6=-\bar{x}'_7=-\bar{x}'_8$ Requirement #5a: $I'_{xx,1}=I'_{xx,2}$ Requirement #5b: $I'_{xx,3}=I'_{xx,4}$ Requirement #5c: $I'_{xx,5}=I'_{xx,6}$ Requirement #5d: $I'_{xx,7}=I'_{xx,8}$ Requirements #1 and #2 are fulfilled if all XMR-resistors are placed either symmetrically on the x'-axis or have a symmetrical shape mirrored at the x'-axis. Therefore, the XMR-resistors #1', #3', #5', #' are placed centrally and symmetrically on the x'-axis, wherein the XMR-resistors #2', #4', #6', #8' are split up in two equal parts and placed symmetrically above and below the x'-axis Requirements #3 and #4 denote that the x-coordinates of the gravity centers of the two resistors of each half bridge are identical and that they have opposite sign for the two half-bridges constituting the full bridge.

Requirements #5a . . . d are fulfilled if the shapes and magnitudes of the x-positions of the two resistors in each half-bridge are identical.

Thus, the magneto-resistive angle sensor 208 of FIG. 6 comprises a first full bridge circuit 210 having a first and fourth magneto-resistive element R'1 and R'4 with a first reference direction parallel to a first axis in a first direction x", and a second and third magneto-resistive element R'2 and R'3 with a second reference direction anti-parallel to the first axis in the first direction x". The magneto-resistive angle sensor 208 further comprises a second full bridge circuit 220 comprising a fifth and eighth magneto-resistive element R'5 and R'8 with a third reference direction parallel to a second axis in a second direction y", and a sixth and seventh magneto-resistive element R'6, R'7 with a fourth reference direction anti-parallel to the second axis in the second direction y".

The gravity centers of the first to eighth magneto-resistive elements of the first and second full bridge circuits have an identical y'-coordinate, i.e. Requirement #1:

$$\bar{y}'_1 = \bar{y}'_2 = \bar{y}'_3 = \bar{y}'_4 = \bar{y}'_5 = \bar{y}'_6 = \bar{y}'_7 = \bar{y}'_8 = 0$$

This equation is a short-hand notation of the more practical conditions $$|\bar{y}'_1 - \bar{y}'_2| < 0.3 \times (|\bar{y}'_1| + |\bar{y}'_2|)/2, |\bar{y}'_1 - \bar{y}'_3| < 0.3 \times (|\bar{y}'_1| + |\bar{y}'_3|)/2, |\bar{y}'_1 - \bar{y}'_4| < 0.3 \times (|\bar{y}'_1| + |\bar{y}'_4|)/2, |\bar{y}'_1 - \bar{y}'_5| < 0.3 \times (|\bar{y}'_1| + |\bar{y}'_5|)/2, |\bar{y}'_1 - \bar{y}'_6| < 0.3 \times (|\bar{y}'_1| + |\bar{y}'_6|)/2, |\bar{y}'_1 - \bar{y}'_7| < 0.3 \times (|\bar{y}'_1| + |\bar{y}'_7|)/2, |\bar{y}'_1 - \bar{y}'_8| < 0.3 \times (|\bar{y}'_1| + |\bar{y}'_8|)/2.$$

The values of the deviation moments of the first to eighth magneto-resistive elements vanish (are about zero), i.e. Requirement #2:

$$I'_{xy,1} = I'_{xy,2} = I'_{xy,3} = I'_{xy,4} = I'_{xy,5} = I'_{xy,6} = I'_{xy,7} = I'_{xy,8} = 0$$

This equation is a short-hand notation of the more practical conditions $$|I'_{xy,1} - I'_{xy,2}| < 0.3 \times (|I'_{xy,1}| + |I'_{xy,2}|)/2, |I'_{xy,1} - I'_{xy,3}| < 0.3 \times (|I'_{xy,1}| + |I'_{xy,3}|)/2, |I'_{xy,1} - I'_{xy,4}| < 0.3 \times (|I'_{xy,1}| + |I'_{xy,4}|)/2, |I'_{xy,1} - I'_{xy,5}| < 0.3 \times (|I'_{xy,1}| + |I'_{xy,5}|)/2, |I'_{xy,1} - I'_{xy,6}| < 0.3 \times (|I'_{xy,1}| + |I'_{xy,6}|)/2, |I'_{xy,1} - I'_{xy,7}| < 0.3 \times (|I'_{xy,1}| + |I'_{xy,7}|)/2, |I'_{xy,1} - I'_{xy,8}| < 0.3 \times (|I'_{xy,1}| + |I'_{xy,8}|)/2.$$

The gravity centers of the first and second magneto-resistive elements of the first full bridge have an identical first x'-coordinate, and the gravity centers of the third and fourth magneto-resistive elements of the first half bridge have an identical second x'-coordinate which has identical magnitude but opposite sign than the first x'-coordinate, i.e. Requirement #3:

$$\bar{x}'_1 = \bar{x}'_2 = -\bar{x}'_3 = -\bar{x}'_4.$$

This is a short-hand notation for the more practical conditions $$|\bar{x}'_1 - \bar{x}'_2| < 0.3 \times (|\bar{x}'_1| + |\bar{x}'_2|)/2, |\bar{x}'_1 + \bar{x}'_3| < 0.3 \times (|\bar{x}'_1| + |\bar{x}'_3|)/2, |\bar{x}'_1 + \bar{x}'_4| < 0.3 \times (|\bar{x}'_1| + |\bar{x}'_4|)/2.$$

Requirement #3 denotes that the x-coordinates of the gravity centers of the two magneto-resistors R'1, R'2 (first half bridge) and the x'-coordinates of the gravity centers of the two magneto-resistors R'3, R'4 (second half bridge) are identical, and that the x'-coordinates have an opposite sign for the two half-bridges R'1, R'2 and R'3, R'4 which constitute the first full bridge.

The gravity centers of the fifth and sixth magneto-resistive elements of the second full bridge circuit have an identical third x'-coordinate, and the gravity centers of the seventh and eighth magneto-resistive elements of the second half bridge circuit have an identical fourth x'-coordinate with identical magnitude but opposite sign as the third x'-coordinate, i.e. Requirement #4:

$$\bar{x}'_5 = \bar{x}'_6 = -\bar{x}'_7 = -\bar{x}'_8.$$

Requirement #4 denotes that the x-coordinates of the gravity centers of the two magneto-resistors R'5, R'6 (third half bridge) and the x'-coordinates of the gravity centers of the two magneto-resistors R'7, R'8 (fourth half bridge) are identical, and that the x'-coordinates have an opposite sign for the two half-bridges R'5, R'6 and R'7, R'8 which constitute the second full bridge.

The first and second magneto-resistive elements R'1, R'2 have the same inertia moment around the second axis y', i.e. Requirement #5a:

$$I'_{xx,1} = I'_{xx,2}.$$

In a more practical sense this means $|I'_{xx,1} - I'_{xx,2}| < 0.3 \times (|I'_{xx,1}| + |I'_{xx,2}|)/2$.

The third and fourth magneto-resistive elements R'3, R'4 have the same inertia moment around the second axis y', i.e. Requirement #5b:

$$I'_{xx,3} = I'_{xx,4}.$$

The fifth and sixth magneto-resistive elements R'5, R'6 have the same inertia moment around the second axis y', i.e. Requirement #5c:

$$I'_{xx,5} = I'_{xx,6}.$$

The seventh and eighth magneto-resistive elements R'7, R'8 have the same inertia moment around the second axis y', i.e. Requirement #5d:

$$I'_{xx,7} = I'_{xx,8}.$$

As shown in FIG. 6, the first direction x' and the second direction y' are orthogonal to each other. The first to eighth magneto-resistive elements R'1-R'8 of the magneto-resistive angle sensor 208 may be located on the same semiconductor die. The magneto-resistive sensor elements are, for example, AMR elements, GMR elements or TMR elements.

In other words, each rectangle is subtended essentially homogenously with the resistor stripe (e.g. in the shape of one or more meanders or spirals or similar). The resistors #2 (R'2), #4 R'4), #6 (R'6), #8 (R'8) are split in two equal parts and placed mirror symmetric to the x'-axis. Thus, this makes their y'-coordinate of gravity centers vanish. The y'-coordinate of the gravity centers of resistors #1 (R'1), #3 (R'3), #5 (R'5), #7 (R'7) vanish because they are placed exactly on the x'-axis. The x'-coordinates of resistors #1 (R'1) and #2 (R'2) are equal, and mirrored at the y'-axis it gives resistors #3 (R'3) and #4 (R'4). The x'-coordinates of resistors #5 (R'5) and #6 (R'6) are equal, and mirrored at the y'-axis it gives resistors #7 (R'7) and #8 (R'8).

According to embodiments of the present disclosure, a magneto-resistive angle sensor for detecting a magnetic field comprises magneto-resistive sensor elements or structures, which are generally referred to as magneto-resistive (XMR) sensor elements. The term "magneto-resistive sensor element" is to include all known magnetoresistive structures such as AMR (anisotropic magneto resistance) structures, GMR (giant magneto resistance) structures or TMR (tunnel magneto resistance) structures.

To be more specific, according to embodiments of the present disclosure, any magneto-resistive sensor elements or structures having a reference direction can be utilized for the inventive magneto-resistive angle sensor for detecting a magnetic field. In addition, in the context of the present disclosure, reference directions with +/−45° and 0°/90° against an x"-axis are generally used, wherein it is only necessary that the layout of the resistors of a half-bridge satisfy the above requirements.

In technical applications of GMR and TMR sensor assemblies so-called spin-valve structures are often used, for example. In case of AMR sensor elements, the reference direction is given by the current flow direction through the AMR structure. When using AMR sensor elements it should be considered that an AMR half-bridge includes resistors with two reference directions, which do not differ by 180° as in GMR and TMR, but only by 90°.

FIG. 8 shows a schematic view of two full-bridge circuits with the eight AMR sensor elements for the magneto-resistive angle sensor of FIG. 6. To be more specific, FIG. 2 shows schematics of the four AMRs resistors of a full (a) X"-bridge with output signal $S_{x'}$ and (b) Y"-bridge with output signal $S_{y''}$. The lines inside the symbols of the resistors denote the direction of current flow in the AMRs. FIG. 8(a) corresponds to 110 in FIG. 2, if the resistors R3' and R4' are replaced by non-magnetic resistors Rnm and Rnm. Also FIG. 8(b) corresponds to 120 in FIG. 2, if the resistors R6' and R7' are replaced by non-magnetic resistors Rnm and Rnm. In other words, with AMR-sensor elements it is possible to build up angle sensors comprising half-bridges as well as one can build up angle sensors comprising full-bridges.

In the following, the general operation principle of the 8-AMR angle sensor is described. The sensor consists of 8 AMR resistors:

Four X"-AMRs are connected to a full bridge circuit (FIG. 8). They are aligned so that the current flows in ±x"- and ±y"-directions (the polarity is irrelevant). The reference directions of four Y"-AMRs are rotated by 45° against the reference directions of the X"-AMRs. The current flow through AMR-resistor R'1 is parallel to ±x"-direction. $\vec{n}_{x''}$, $\vec{n}_{y''}$, are unit vectors in the x"- and y"-directions; they lie in the die surface and $\vec{n}_{x''}$ is perpendicular to both $\vec{n}_{x''}$, $\vec{n}_{y''}$. x', y' describe the location of an infinitesimal small part of the sensor element on the die. The AMR sensors are on top of the die z'=0. So the primed quantities describe the geometrical shapes and locations, whereas the double-primed quantities describe the reference directions of the sensor elements. The field components $B_{x''}$, $B_{y''}$, $B_{z''}$ in the layout coordinate system are functions of the coordinates in the die surface x', y' and of the directions of the x"- and y"-axes (so e.g. $B_{x''}=\vec{B}\cdot\vec{n}_{x''}$). The resistance of the first magneto-resistor is given by $R_1=R_0+\Delta R \cos^2\kappa_1$, where $R_0$ is a base resistance and $\Delta R$ is the maximum resistance change due to AMR-effect (typically 2.5% of base resistance). The angle $\kappa_1$ is between the projection of the magnetic field into the die surface (the in-plane field component) and the x"-direction $$\cos^2\theta_1 = K_{x'',1}^2 = (B_{x''}(x'_1,y'_1))^2/\{(B_{x''}(x'_1,y'_1))^2+(B_{y''}(x'_1,y'_1))^2\}$$

with AMR-resistor R'1 located at $x'_1 \vec{n}_{x''}+y'_1 \vec{n}_{y''}$. This holds if the AMR-resistor is small. If it has some finite extension the square of the cosine becomes $$\cos^2\kappa_1 = \frac{1}{A_{1'}} \int_{A_{1'}} K_{x'',1}^2 dx' dy'$$

Whereby the integral is carried out over the entire shape of resistor R'1.

The direction of current through AMR-resistor R'3 is parallel to y"-direction. Hence, its resistance is given by $$R_3=R_0+\Delta R \cos^2(\pi/2-\kappa_3)=R_0+\Delta R \sin^2 \kappa_3.$$

The angle $\kappa_3$ is between the in-plane field component and the x"-direction on the location of the AMR-resistor R'3 with $$\sin^2 \kappa_3 = K_{y'',3}^2 = (B_{y''}(x'_3,y'_3))^2/\{(B_{x''}(x'_3,y'_3))^2+(B_{y''}(x'_3,y'_3))^2\}$$

The reference direction of AMR-resistor R'5 is parallel to $\vec{n}_{x''}+\vec{n}_{y''}$. Its resistance is $$R_5=R_0\pm\Delta R(0.5+K_{x'',5}K_{y'',5}).$$

AMR-resistor R'7 is parallel to $\vec{n}_{x''}-\vec{n}_{y''}$. Its resistance is $$R_7=R_0+\Delta R(0.5-K_{x'',7}K_{y'',7}).$$

For 1 V supply voltage of both bridges and $\Delta R \ll R_0$ the output voltages are $$S_{x''}\approx\sigma(\Delta R/(4R_0))(K_{x'',1}^2+K_{x'',2}^2-K_{y'',3}^2-K_{y'',4}^2)$$

$$S_{y''}\approx\sigma(\Delta R/(4R_0))(K_{x'',5}K_{y'',5}+K_{x'',6}K_{y'',6}+K_{x'',7}K_{y'',7}+K_{x'',8}K_{y'',8})$$

$\sigma=1$ if the dipole moment of the magnet points in negative y-direction. $\sigma=-1$ if the dipole moment of the magnet points in positive y-direction. Some AMR angle sensors use only half-bridges instead of full bridges like in FIG. 8. Thus they need only four instead of eight AMR resistors. In this case half to the terms for $S_{X''}$ and $S_{Y''}$ have to be dismissed.

A further embodiment is a sensor system, which comprises at least three sub-units, each sub-unit comprises a magneto-resistive angle sensor 108 or 208 (as described above). The sub-units 108, 208 are arranged symmetrically on different positions corresponding to a geometric circle, the geometric circle comprising the rotation axis of the sensor system as center point. The geometrical positions of the at least three (N≤3) sub-units are shifted against each other azimuthally by 360° divided by the number N of the sub-units (360°/N), wherein the radial and axial positions are identical. The first direction is tangential to a rotation movement around the rotation axis, and wherein the second direction is radial to the rotation movement around the rotation axis. Such a sensor system may be implemented as the off-axis angle sensor with three subunits (satellites) of FIGS. 1a-b utilizing the geometrical layout of a magneto-resistive angle sensor as described in connection with FIGS. 5a-c and 6.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present disclosure. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A magneto-resistive angle sensor, comprising:
 a first half bridge circuit comprising a first magneto-resistive element and a second magneto-resistive element, and
 a second half bridge circuit comprising a third magneto-resistive element and a fourth magneto-resistive element;
 wherein the first, second, third, and fourth magneto-resistive elements are arranged parallel to a x'/y'-plane of a Cartesian reference system with an x'-axis and y'-axis, both orthogonal to each other;
 wherein a geometrical gravity center of each of the first and the second magneto-resistive elements of the first half bridge circuit have, within a tolerance range, an identical x'-coordinate and an identical y'-coordinate,
 wherein a geometrical gravity center of each of the third and the fourth magneto-resistive elements of the second half bridge circuit have, within a tolerance range, an identical x'-coordinate and an identical y'-coordinate,
 wherein a sum of a value of a geometrical inertia moment of the first magneto-resistive element around the y'-axis, a negative value of a geometrical inertia moment of the second magneto-resistive element around the y'-axis, a value of a geometrical deviation moment of the third magneto-resistive element in the x'/y'-plane and a negative value of a geometrical deviation moment of the fourth magneto-resistive element in the x'/y'-plane vanishes within a tolerance range, and
 wherein a sum of a value of a geometrical inertia moment of the third magneto-resistive element around the y'-axis, a negative value of a geometrical inertia moment of the fourth magneto-resistive element around the y'-axis, a negative value of a geometrical deviation moment of the first magneto-resistive element in the x'/y'-plane and a value of a geometrical deviation moment of the second magneto-resistive element in the x'/y' vanishes within a tolerance range.

2. The magneto-resistive angle sensor according to claim 1, wherein the first magneto-resistive element has a first reference direction and the second magneto-resistive element has a second reference direction different than the first reference direction, and wherein the third magneto-resistive element has a third reference direction and the fourth magneto-resistive element has a fourth reference direction different than the third reference direction; and wherein the first, second, third, and fourth reference directions are parallel to the x'/y'-plane.

3. The magneto-resistive angle sensor according to claim 2, wherein the second reference direction is anti-parallel to the first reference direction, and wherein the fourth reference direction is anti-parallel to the third reference direction.

4. The magneto-resistive angle sensor according to claim 3, wherein the magneto-resistive sensor elements comprise GMR elements or TMR elements.

5. The magneto-resistive angle sensor according to claim 2, wherein the second reference direction is orthogonal to the first reference direction, and wherein the fourth reference direction is orthogonal to the third reference direction.

6. The magneto-resistive angle sensor according to claim 5, wherein the magneto-resistive sensor elements comprise AMR elements.

7. The magneto-resistive angle sensor according to claim 1,
 wherein the geometrical gravity centers of the first and the second magneto-resistive elements of the first half bridge circuit have, within a tolerance range, an identical y'-coordinate, and
 wherein the geometrical gravity centers of the third and fourth magneto-resistive elements of the second half bridge circuit have, within a tolerance range, an identical y'-coordinate.

8. The magneto-resistive angle sensor according to claim 1, wherein an extension of the first, second, third and fourth magneto-resistive elements in the x'-direction is larger by at least a factor of two than in the second direction.

9. The magneto-resistive angle sensor according to claim 1, wherein the first, second, third and fourth magneto-resistive elements are located on the same semiconductor die.

10. The magneto-resistive angle sensor according to claim 1, wherein the direction of movement of the magnetic field versus the angle sensor elements is parallel or anti-parallel to the x'-direction.

11. A sensor system, comprising:
 at least three sub-units, each sub-unit comprises a magneto-resistive angle sensor according to claim 1, wherein the sub-units are arranged symmetrically on different positions corresponding to a geometric circle, the geometric circle comprising a rotation axis of the sensor system as a center point.

12. The sensor system according to claim 11, wherein the positions of the at least three (N>=3) sub-units are shifted with respect to each other azimuthally by 360° divided by the number N of the sub-units (360°/N), wherein radial and axial positions are identical within a tolerance range.

13. The sensor system according to claim 11, wherein a direction of movement of magneto-resistive angle sensor elements versus the magnetic field is parallel or anti-parallel to the x'-direction.

14. A magneto-resistive angle sensor, comprising:
 a first full bridge circuit having a first and fourth magneto-resistive element and a second and third magneto-resistive element, and
 a second full bridge circuit comprising a fifth and eighth magneto-resistive element, and a sixth and seventh magneto-resistive element,
 wherein the first to eighth magneto-resistive elements are arranged parallel to a x'/y'-plane of a Cartesian reference system with an x'-axis and y'-axis, both orthogonal to each other;
 wherein a geometrical gravity center of each of the first to eighth magneto-resistive elements of the first and second full bridge circuits have, a within a tolerance range, a vanishing y'-coordinate, wherein a value of a geometrical deviation moment of each of the first to eighth magneto-resistive elements in the x'/y'-plane, within a tolerance range, vanishes, wherein the geometrical gravity centers of the first and second magneto-resistive elements of the first full bridge have, within a tolerance range, an identical first x'-coordinate, and the geometrical gravity centers of the third and fourth magneto-resistive elements of the first full bridge have, within a tolerance range, an identical second x'-coordinate, wherein the first and second x'-coordinates have, within a tolerance range, an equal magnitude and an opposite sign, wherein the geometrical gravity centers of the fifth and sixth magneto-resistive elements of the second full bridge circuit have, within a tolerance range, an identical third x'-coordinate, and the geometrical gravity centers of the seventh and eighth magneto-resistive elements of the second half bridge circuit have, within a tolerance range, an identical fourth x'-coordinate, wherein the third and fourth x'-coordinates have, within a tolerance range, an equal magnitude and an opposite sign, and wherein the first and second magneto-resistive elements have, within a tolerance range, a same geometrical inertia moment around the y'-axis, the third and fourth magneto-resistive elements have, within a tolerance range, a same geometrical inertia moment around the y'-axis, the fifth and sixth magneto-resistive elements have, within a tolerance range, a same geometrical inertia moment around the y'-axis, and the seventh and eighth magneto-resistive elements have, within a tolerance range, a same geometrical inertia moment around the y'-axis.

15. The magneto-resistive angle sensor according to claim 14, wherein the first and fourth magneto-resistive element have a first reference direction, and the second and third magneto-resistive element have a second reference direction different than the first direction, and wherein the fifth and eighth magneto-resistive element have a third reference direction, and the sixth and seventh magneto-resistive element have a fourth reference direction different than the third reference direction, and wherein the first, second, third, and fourth reference directions are parallel to the x'/y'-plane.

16. The magneto-resistive angle sensor according to claim 15, wherein the second reference direction is anti-parallel to the first reference direction, and wherein the fourth reference direction is anti-parallel to the second reference direction.

17. The magneto-resistive angle sensor according to claim 16, wherein the magneto-resistive sensor elements comprise GMR elements or TMR elements.

18. The magneto-resistive angle sensor according to claim 15, wherein the second reference direction is orthogonal to the first reference direction, and wherein the fourth reference direction is orthogonal to the second reference direction.

19. The magneto-resistive angle sensor according to claim 18, wherein the magneto-resistive sensor elements comprise AMR elements.

20. The magneto-resistive angle sensor according to claim 14, wherein the first to eighth magneto-resistive elements are located on the same semiconductor die.

21. A magneto-resistive angle sensor, comprising:

a first half bridge circuit comprising a first magneto-resistive element and a second magneto-resistive element, and a second half bridge circuit comprising a third magneto-resistive element and a fourth magneto-resistive element;

wherein the first, second, third, and fourth magneto-resistive elements comprise a layout having two orthogonal meanders, wherein the meanders cover a rectangular area, wherein the first, second, third, and fourth magneto-resistive elements are arranged parallel to a x'/y'-plane with respect to a Cartesian reference system with an x'-axis and y'-axis, both orthogonal to each other;

wherein a geometrical gravity center of each of the first and the second magneto-resistive elements of the first half bridge circuit have essentially an identical x'-coordinate, wherein a geometrical gravity center of each of the third and the fourth magneto-resistive elements of the second half bridge circuit have essentially an identical x'-coordinate, wherein a sum of a value of a geometrical inertia moment of the first magneto-resistive element around the y'-axis, a negative value of a geometrical inertia moment of the second magneto-resistive element around the y'-axis, a value of a geometrical deviation moment of the third magneto-resistive element in the x'-y' plane and a negative value of a geometrical deviation moment of the fourth magneto-resistive element in the x'-y' plane essentially vanishes, and wherein a sum of a value of a geometrical inertia moment of the third magneto-resistive element around the y'-axis, a negative value of a geometrical inertia moment of the fourth magneto-resistive element around the y'-axis, a negative value of a geometrical deviation moment of the first magneto-resistive element in the x'-y' plane and a value of a geometrical deviation moment of the second magneto-resistive element in the x'-y' plane essentially vanishes.

* * * * *